United States Patent [19]

Marshall, Jr.

[11] Patent Number: 4,897,296

[45] Date of Patent: Jan. 30, 1990

[54] FABRIC FOR PROTECTIVE GARMENTS

[75] Inventor: Ben H. Marshall, Jr., Midlothian, Va.

[73] Assignee: E. I. Du Pont de Nemours & Co., Wilmington, Del.

[21] Appl. No.: 303,994

[22] Filed: Jan. 27, 1989

Related U.S. Application Data

[63] Continuation of Ser. No. 57,441, Jun. 2, 1987, abandoned.

[51] Int. Cl.⁴ .............................................. D04H 1/04
[52] U.S. Cl. .................................... 428/102; 428/288; 428/296
[58] Field of Search .................... 428/102, 288, 296

[56] References Cited

U.S. PATENT DOCUMENTS

| | | | |
|---|---|---|---|
| 3,169,899 | 2/1965 | Steuber | 161/72 |
| 4,272,851 | 6/1981 | Goldstein | 2/79 |
| 4,303,712 | 12/1981 | Woodroof | 428/102 |

Primary Examiner—Alexander S. Thomas

[57] ABSTRACT

An improved fabric is provided for use in a protective garment. The fabric has two composites seamed together. Each composite is formed from a spunbonded olefin which has been laminated to a three-layered thermoplastic film. Compared to a fabric with only one composite layer, various chemicals require more than 2.9 to more than 240 times as much time to penetrate the two-composite fabric of the invention.

7 Claims, 1 Drawing Sheet

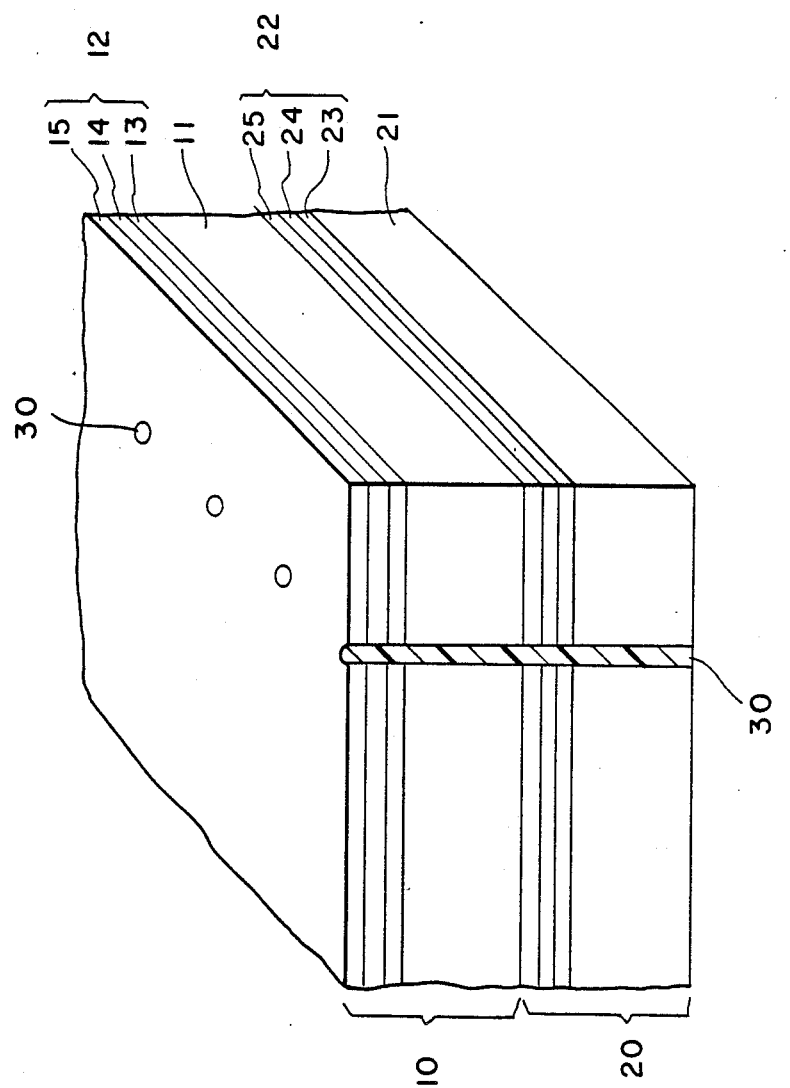

FABRIC FOR PROTECTIVE GARMENTS

This application is a continuation of application Ser. No. 07/057,441 filed June 2, 1987 now abandoned.

BACKGROUND OF THE INVENTION

1. Field of the Invention

This invention relates to an improved fabric that is suitable for use in garments that provide protection against contact with hazardous substances. More particularly, the invention concerns such a fabric that includes at least two layers of a composite of a polyethylene film-fibril spunbonded sheet laminated to a three-layered film.

2. Description of the Prior Art

Workers in many industries need protection from hazardous substances. Some such protection is often in the form of a disposable, or limited use, outer garment which prevents worker's clothing or skin from contacting the hazardous material. Chemical-plant workers, asbestos removers, radioactive-contamination cleaners, chemical-waste disposal workers, and farmers handling various agricultural chemicals and pesticides are among the many users of such protective garments. Such garments need to be as impervious to chemicals as is consistent with safety, comfort and cost. Many of the disposable garments now available commercially provide only short-term protection. Chemicals can pass through such garments in but a few minutes, after which the wearer must immediately leave the work area, remove the contaminated clothing, and shower. Such short-term protection results in lost production time and, more importantly, in unwanted exposure of the worker to the hazardous substances.

Goldstein, U.S. Pat. No. 4,272,851, discloses protective garments made of spunbonded, polyethylene nonwoven sheet (e.g., "Tyvek", sold by E. I. du Pont de Nemours and Company) which may be coated or laminated on one one side with a polyethylene film. Steuber, U.S. Pat. No. 3,169,899, discloses detailed characteristics and a method of manufacture of the spunbonded olefin sheets made from flash-spun, polythylene, film-fibril plexifilammentary strands. Du Pont brochure, E-32814, entitled "For hazardous or dirty jobs . . . protect your workers with garments of "TYVEK" Spunbonded Olefin", discloses garments made from the spunbonded olefin nonwoven sheets laminated with coextruded multilayered thermoplastic film (e.g., "Saranex", sold by Dow Chemical Company) along with the permeation characteristics of these laminated sheets. A Dow Chemical Company brochure, entitled "About Films of Saranex", describes "Saranex" as a layer of "Saran", integrally sandwiched between layers of polyethylene. This three-layered product is extruded as a single film without orientation. "Saranex 23" film differs from other "Saranex" products in that the "Saran" is coated on one side with low density polyethylene and on the other side with ethylene vinylacetate/low density polyethylene copolymer. "Saran" is a copolymer of vinyl chloride and vinylidine chloride.

Although the known protective garments have enjoyed some commercial success, there is need for fabrics that would provide protective garments with more time before hazardous substances could pass through the fabric (i.e., increase the so-called "hold-out time" of the substances by the fabric). Accordingly, an object of this invention is to provide such an improved fabric to enhance the utility of protective garments.

SUMMARY OF THE INVENTION

The present invention provides an improved fabric that is particularly suited for use in a protective garment. The fabric is of the type that includes a composite which is a spunbonded polyethylene film-fibril sheet laminated to a three-layered film of coextruded layers of low density polyethylene on both faces of a central layer of a copolymer of vinyl chloride and vinylidine chloride. The improvement of the present invention comprises the fabric having a first composite and a second composite seamed together with the spunbonded sheet of the first composite being in contact and in face-to-face relationship with the three-layered film of the second composite. In one embodiment of the invention the polyethylene layer on one face of the three-layered film includes a copolymer of ethylene vinylacetate.

Surprisingly, as shown in the Example below, hold-out times for various chemicals to break through the improved two-composite fabric of the invention are about three to greater than two-hundred-and-forty times those of the known one-composite fabric.

BRIEF DESCRIPTION OF THE DRAWING

The invention will be better understood by reference to the drawing in which an improved two-composite fabric of the invention is depicted. In the drawing, the composites are designated numerals 10 and 20; the spunbonded polyethylene film-fibril sheets, 11 and 21; the three-layered thermoplastic film laminates 12 and 22; and a thermally-formed seam 30, which connects two composites. One of the low density polyethylene layers of the three-layered film is designated 13 and 23; the middle layer of vinyl chloride and vinylidine chloride copolymer, 14 and 24; and the other low density polyethylene film layer (which may also include ethylene vinylacetate copolymer), 15 and 25.

DETAILED DESCRIPTION OF PREFERRED EMBODIMENTS

When nonwoven fabric of the invention is used for the fabric of protective garment, the polyethylene film-fibril sheet, designated 21 in the drawing, is positioned on the inside of the garment, and three-layered film 10 is positioned on the outside of the garment (i.e., the side that would be exposed to the hazardous substance).

Suitable conventional methods for laminating three-layered films 12 and 22 to film-fibril sheets 11 and 21 respectively, to form composites 10 and 20 respectively, include hot calendering and hot-melt adhesion with molten polyethylene as hot-melt adhesive.

Composites 10 and 20 are seamed to each other in face-to-face relationship with the polyethylene film-fibril sheet 11 of the outer composite 10 in contact with the three-layered film 22 of the inner composite 20. Seam 30 usually is formed after the two composites have been arranged in the desired face-to-face relationship and cut into the shapes desired for the final garment (e.g. shirts, gowns, aprons, overalls, or other protective garments and the like). Seam 30 can be formed by ultrasonic bonding, thermal point-bonding, glueing, sewing with thread, or by other equivalent means. The seam provides sufficient connection between the two composites to hold them in the desired face-to-face contact while maintaining the integrity of individual composites 10 and 20. To be useful in protective garments, when seam 30 is made by stitching, the thread is of a material that is at least as resistant to chemical penetration as is the remainder of the fabric.

Suitable thicknesses for the various components of the composite fabric of the invention generally are in the following ranges:

| | |
|---|---|
| Spunbonded film-fibril olefin sheet | 0.05–0.15 mm |
| Three-layered film | 0.04–0.10 mm |
| Film-sheet composite | 0.1–0.3 mm |

More than two layers of composite of the type described hereinbefore can be used to form a fabric for a protective garment. The fabric would provide further resistance to chemical penetration, but the extra layers reduce wear-comfort and increase cost.

EXAMPLE

In this example, the surprisingly superior ability of the nonwoven, two-composite fabric of the invention to delay various chemicals from breaking through the fabric is demonstrated in comparison with a one-composite fabric of the art.

Samples of the two-composite and one-composite fabrics were tested for resistance to breakthrough by various chemicals in accordance with ASTM 739-81 (American Society for Testing Materials). Areas including seams were excluded from the test. The time for a given chemical to break through or penetrate a fabric sample (i.e., hold-out time) was measured in minutes. The hold-out time is considered to be a very important parameter for fabrics intended for protective garments. Samples were tested for a maximum of 480 minutes.

The composites were made as follows. "Tyvek" Style 1422A spunbonded olefin (i.e., polyethylene film-fibril sheet of 0.13-mm thickness and 39-g/m$^2$ unit weight) sold by E. I. du Pont de Nemours and Company was laminated to "Saranex" 23 (three-layered thermoplastic film of 0.05-mm thickness) sold by Dow Chemical Company to form a composite. The composite had a total thickness of about 0.3 mm. Such composites are manufactured and sold by Jen-Coat Inc. of Westfield, Mass. A single ply of composite was tested as representative of the prior art fabric. Two plies of composite were ultrasonically seamed in accordance with the invention. The hold-out time of the test fabrics for various chemicals is summarized in Table I, below.

Note the greater than 2.9 to greater than 240 times longer hold-out times of the fabrics of the invention over those of the prior art. Note also the strong resistance to methanol, sodium hydroxide and sulfuric acid of both, the prior-art sample and the sample of the invention.

These data show that two composites, stitched together in accordance with the invention, can have hold-out times that are more than as much as about 240 times longer than those of the one-composite fabrics known in the art.

TABLE I

| | Hold-out times (minutes) | | |
|---|---|---|---|
| Chemical | Prior Art | Example | Ratio* |
| acetone | 33 | 180 | 5.5 |
| acetonitrile | 97 | >480 | >5 |
| carbon disulfide | — | 5 | — |
| diethylamine | 44 | 145 | 3.3 |
| ethyl acetate | 36 | 130 | 3.6 |
| n-hexane | 2 | >480 | >240 |
| methanol | >480 | >480 | — |
| methylene chloride | 2 | 10 | 5 |
| nitrobenzene | 165 | >480 | >2.9 |
| sodium hydroxide | | | |
| 40% | >480 | — | — |
| 50% | — | >480 | — |
| sulfuric acid, 98% | >480 | >480 | — |
| tetrachloroethylene | 13 | 303 | 23.3 |
| toluene | <5 | 82 | >16.4 |

*Ratio = Hold-out time of Example sample divided by hold-out time of prior-art sample.

I claim:

1. An improved fabric particularly suited for protective garments, the fabric having a composite of a spunbonded polyethylene film-fibril sheet laminated to a three-layered film of coextruded layers of low density polyethylene on both faces of a central film layer of a copolymer of vinyl chloride and vinylidine chloride, the improvement comprising the fabric consisting essentially of a first composite seamed to a second composite, the spunbonded sheet of the first composite being in contact and in face-to-face relationship throughout the fabric with the three-layered film of the second composite.

2. An improved fabric in accordance with claim 1 wherein the polyethylene layer on one face of the three-layered film includes a copolymer of ethylene vinylacetate.

3. An improved fabric in accordance with claim 1 or 2 wherein the thickness of the spunbonded sheet is in the range of 0.05 to 0.15 mm, the thickness of the three-layered film is in the range of 0.04 to 0.10 mm and the thickness of the composite is in the range of 0.1 to 0.3 mm.

4. An improved fabric in accordance with claim 1 or 2 wherein the composites are seamed together by an ultrasonically formed seam.

5. An improved fabric in accordance with claim 1 or 2 wherein the composites are seamed together by a sewing thread.

6. An improved fabric in accordance with claim 1 or 2 wherein the composites are seamed together by a thermally bonded seam.

7. A protective garment made with the improved fabric of claim 1 or 2.

* * * * *